March 26, 1940. B. VON SCHLIPPE 2,195,041
MEANS FOR DAMPING OSCILLATIONS
Filed Sept. 5, 1936
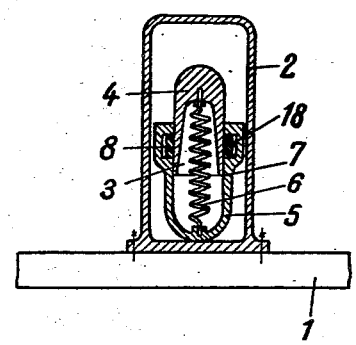
Fig.1
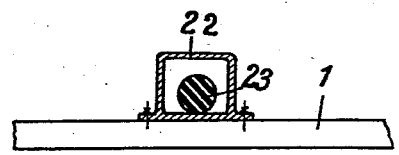
Fig.2
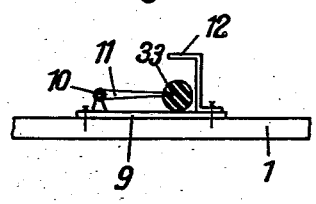
Fig.3
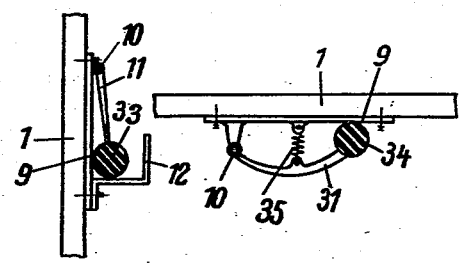
Fig.4  Fig.5
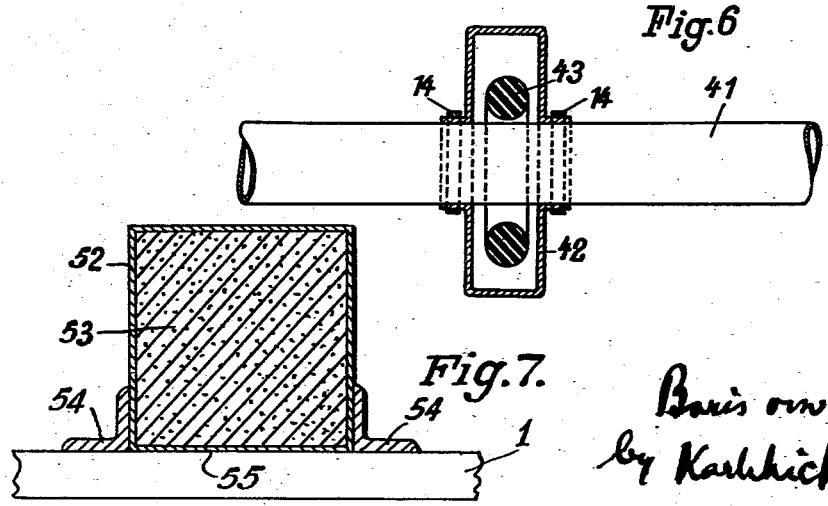
Fig.6
Fig.7
Inventor:
Boris von Schlippe
by Karl Michaelis atty Patented Mar. 26, 1940

2,195,041

UNITED STATES PATENT OFFICE 2,195,041

MEANS FOR DAMPING OSCILLATIONS

Boris von Schlippe, Dessau in Anhalt, Germany, assignor to Junkers Flugzeug-und-Motorenwerke Aktiengesellschaft, Dessau, Germany Application September 5, 1936, Serial No. 99,677
In Germany September 23, 1935

10 Claims. (Cl. 188—103)

My invention relates to means for damping oscillations arising in machinery, in buildings or the like. It is an object of my invention to provide means of the kind aforesaid which are simpler in construction and use and more efficient than other devices hitherto designed for the same purpose and which offer other advantages of their own which will be described farther below.

Many kinds of oscillation damping devices have been suggested, in most of which oscillatory movements of parts of a building, of a machine or the like are damped by the transformation of a material part of the energy, which incites or generates the oscillation, into external frictional energy, which is consumed by two friction members shifting relative to each other during the oscillation and one of which is connected with the oscillating part. In some of the prior devices the inner friction of a liquid has been resorted to for the damping of oscillations, for instance by forcing this liquid through narrow passages. While damping devices of the kinds aforesaid frequently render useful services, most of them present a comparatively involved and heavy construction. There have further been suggested damping devices in which oscillations are damped by the consumption of energy by a damping member set to oscillate in resonance with the oscillation to be damped. Devices of this latter kind involve the drawback of becoming operative only at the predetermined oscillation frequency to which the damping member is tuned.

The damping device according to the present invention is of very simple design and extremely light in weight. It offers the further advantage of being fit to be mounted in place also subsequently on the parts of a building, a machine or the like endangered by oscillations.

The invention is based on the conception that the generation of dangerous oscillatory conditions can be avoided by mounting near that point of the oscillating part, at which the maximum of the oscillations occurs, a yielding (elastic) body possessing a considerable inner friction and which is freely movable, at least within certain limits. Free mobility of this body is limited either by stops, casings, springs or links or by the circumstance that the yielding body embraces the oscillating part. Whenever oscillations arise, the damping body is permanently imparted shocks acting in the opposite direction and is thereby shaken and set oscillating, whereby it is subjected to a varying elastic deformation. The energy resulting from such deformation is not recovered in full, but is partly converted into heat. This consumption of energy reduces the amplitude of the oscillations of the oscillating part to the extent that dangerous oscillatory conditions are not attained.

The damping body may consist of several parts held together in an elastic manner and relatively displaceable under friction. I may for instance employ a hollow body with elastic walls filled with a granular or highly viscous material such as for instance sand, or a siruplike mass. I have, however, found it preferable to form the damping body as a whole from an elastic material possessing a high inner friction, such as for instance rubber, leather or the like. A particularly suitable device which is quite especially adapted for damping transversal oscillations of comparatively long and thin parts, has the form of a ring of a material of the kind aforesaid which possesses high inner friction, the inner diameter of this ring being somewhat larger than the diameter of the part, the oscillations of which shall be damped. This ring is mounted on and embraces the part.

In the drawing affixed to this specification and forming part thereof damping devices embodying my invention are illustrated diagrammatically by way of example. In the drawing Fig. 1 is a vertical axial section of a damping device consisting of several coacting parts.

Fig. 2 is a similar view of a damping device comprising a damping body made of a material possessing considerable inner friction.

Fig. 3 is an elevation, partly in section, of another device in which a damping body of similar material is guided by a link, and Fig. 4 illustrates the application of such a device to vertically extending parts to be protected.

Fig. 5 illustrates a further modification of the same device, in which a spring is provided to return the damping member into its position of rest.

Fig. 6 is an elevation, partly in axial section, which comprises an annular damping member formed of a material of high inner friction.

Fig. 7 is a vertical axial view of a damping device in which the damping body is a thin-walled sheet metal box filled with sand.

Referring to the drawing and first to Fig. 1, 1 is a conventional showing of a structural member subject to oscillations and 2 is a casing fixed to this part. 3 is the damping body enclosed in this casing, the body consisting of two relatively slidable sleeves 4 and 5, which are connected by a firmly clamped tension and compression spring 6. 7 is the cylindrical frictional surface formed on the part 4, and 8 is an annular spring firmly embracing the part 4 and seated in an annular depression 18 formed in the part 5.

On the shocks generated by the oscillatory movements of the part 1 being transmitted to the damping body, the part 5 will move away from the part 1. The part 4, being displaceable relatively to the part 5, will not be imparted at once the complete velocity of the part 5, but will partly slide in the same, spring 6 being simultaneously compressed. The more vigorous the oscillations of part 1, which are transmitted to the part 5, the deeper the part 4 will first slide into the part 5 and the more spring 6 will be compressed. The spring will tend to expand again and to transmit the energy stored in it to the part 4. A considerable portion of this energy is transformed into heat by the friction generated between the surface 7 and the elastic ring 8. This amount of energy is withdrawn from the oscillatory energy of the part 1, the amplitude of the oscillations of which is thus reduced. The same events occur on the damping body 3 striking the top of the casing 2, so that the part 4 is imparted a shock from above, and the same series of movements and energy transmissions will be gone through anew each time the body 3 is imparted a shock from below or from above. Due to the relatively slidable sleeves 4 and 5, the movements of the damping body 3 can never adopt the frequency of the oscillations of the part 1, so that part of the energy of motion is continuously transformed into frictional heat.

While the inner friction of the damping body shown in Fig. 1 results from the friction of its parts 4, 5 and 8, respectively, the inner friction of the damping bodies, illustrated in Figs. 2–6 is that of the material of which these bodies consist.

In the modification illustrated in Fig. 2 a casing 22 is fixed to the part 1, which encloses a damping body 23 having the form of a freely movable rubber ball. The action of the ball in the casing will readily be understood from the description given with reference to Fig. 1.

In the device shown in Fig. 3 a plate 9 is fixed to the oscillating part 1. To this plate is pivoted at 10 a link 11, on the free end of which is mounted a rubber or leather ball 33, which forms the damping body, the movements of which are limited by the check 12.

Fig. 4 illustrates the action of this damping device in connection with a vertically extending part 1 which is assumed to oscillate in horizontal direction.

Fig. 5 shows a similar damping device mounted on the bottom surface of the part 1 to be protected. Here the link 31 carrying the rubber ball 34 is held applied to the plate 9 by a coil spring 35 which serves to return the damping body to its original position after it has received a shock.

In the modification illustrated in Fig. 6 the part 41 to be protected has the form of a tube, the horizontal oscillations of which are intended to be damped. A casing 42 is held on the tube by means of clamping rings 14. The casing encloses a ring 43 made of a material of considerable inner friction, such as rubber, leather or the like, the inner diameter of which is so much larger than the outer diameter of the tube 41, that the ring 43 moves freely on the tube.

Obviously, when the tube is set oscillating transversally to its longitudinal axis, the rubber ring in contact with the tube will be set oscillating also, always returning into contact with the tube at various places and by its impact damping the oscillations of the latter.

In the modification shown in Fig. 7, the thin-walled sheet metal casing 52 filled with sand 53 is mounted by means of the brackets 54 on the part 1 which is assumed to be endangered by vertical oscillations. The walls of the casing 52 and particularly the bottom 54 are elastic so as to transmit oscillations of the part 1 to the sand 53 which acts as a damping means, since frictional heat is developed by the inner friction produced by the relative movements of the individual grains. The energy thus transformed into heat is withdrawn from the oscillation energy of the part 1.

The term "at least indirect contact" as used in the appended claims is intended to refer to either direct contact, or else to contact through an intermediate part such as the bottom parts of the casings in Figs. 1 and 2, or the bottom parts of the stroke limiting means in Figs. 3, 4 and 5. Evidently, for the purposes of the invention all structural arrangements have in common that the freely movable damping body is normally in physical contact, whether direct or indirect, with the oscillating member, while being physically removed from such member upon the occurrence of oscillation therein.

I wish it to be understood that I do not desire to be limited to the exact details of construction shown and described for obvious modifications will occur to a person skilled in the art.

I claim:

1. A damping device for damping oscillations of a structural member and the like, comprising in combination a freely movable damping body arranged on said structural member so as to be normally in at least indirect contact therewith while oscillating within predetermined limits upon the occurrence of oscillations in the structural member, said damping body being elastic so as to be deformed during oscillation while being adapted to oppose to such deformation a resistance sufficing to damp said oscillations.

2. A damping device for damping oscillations of a structural member and the like, comprising in combination stroke limiting means mounted on said structural member and a freely movable damping body arranged in said stroke limiting means so as to normally be in at least indirect contact with said structural member while oscillating within the limits defined by said stroke limiting means upon the occurrence of oscillations in the structural member, said damping body being elastic so as to de deformed during oscillation while being adapted to oppose to such deformation a resistance sufficing to damp said oscillations.

3. A device for damping oscillations of a structural member and the like, comprising in combination a casing arranged upon the members subject to oscillations, and a freely movable elastic damping body within the casing, said elastic body being deformed during oscillation by at least indirect contact with such structural member, said body opposing to such deformation a resistance which acts to dampen said oscillations in the structural member.

4. A device for damping oscillations of structural members and the like comprising in combination a freely movable damping body supported by a structural member and means for supporting said body thereon, said damping body oscillating within predetermined limits in response to oscillations set up in the structural member, said damping body being elastic and being deformed by at least indirect contact with such structural member during oscillation, said body opposing to such deformation a resistance which acts to dampen said oscillations in the structural member.

5. A device for damping oscillations of a structural member and the like comprising an elastic damping body possessing considerable inner friction arranged to normally rest in at least indirect contact with said member, and means positioned by said member for confining the movement of said body within specific limits whereby on oscillation of the member the body is free to bounce repeatedly between said member and said confining means to thereby absorb the energy from said oscillations.

6. A device for damping oscillations of a part of a building, machine or the like, comprising a freely movable elastic damping body possessing a considerable inner friction, said body being in at least indirect contact with the oscillating part.

7. The damping device of claim 6 wherein the damping body consists of rubber.

8. The damping device of claim 6 wherein the damping body comprises a ring arranged to surround the oscillating part and provide a clearance therebetween.

9. A device for damping oscillations of a part of a building, machine or the like, comprising a damping body in two parts arranged for movement relative to each other, one of said parts being normally in at least indirect contact with the part to be damped, said body being freely movable as a unit, means associated with the parts of said damping body operable to frictionally resist relative movement between the two, and yieldable means tending to retain said damping body parts in predetermined relative position.

10. A device for damping oscillations of a part of a building, machine or the like, comprising two sleeves arranged for relative telescoping movement, resilient means adapted to resist relative movement of the two parts, means for creating inner friction between the telescoped surfaces of the two parts on relative movement thereof, said device being arranged with reference to the oscillating part in such manner as to normally lie in at least indirect contact therewith.

BORIS von SCHLIPPE.